United States Patent
Yan et al.

(10) Patent No.: US 10,382,463 B2
(45) Date of Patent: Aug. 13, 2019

(54) TECHNIQUES AND ARCHITECTURES FOR CROSS-ORGANIZATION THREAT DETECTION

(71) Applicant: salesforce.com, inc., San Francisco, CA (US)

(72) Inventors: Ping Yan, San Francisco, CA (US); Huy Hang, Castro Valley, CA (US); Hui Fung Herman Kwong, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 108 days.

(21) Appl. No.: 15/385,491

(22) Filed: Dec. 20, 2016

(65) Prior Publication Data

US 2018/0176239 A1    Jun. 21, 2018

(51) Int. Cl.
H04L 29/06    (2006.01)
(52) U.S. Cl.
CPC ................... H04L 63/1425 (2013.01)
(58) Field of Classification Search
CPC . H04L 63/1416; H04L 63/1425; H04L 63/20; G06F 21/44
USPC ......................................... 726/22–25, 27–30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |

(Continued)

*Primary Examiner* — Hosuk Song
(74) *Attorney, Agent, or Firm* — Jaffery, Watson, Mendonsa & Hamilton, LLP

(57) ABSTRACT

Threat detection in a multi-organizational environment. Attribute data corresponding to accesses to a multi-organizational environment and entity data corresponding to accesses to the multi-organizational environment are maintained. A graph based on the attribute data and the entity data where graph edges represent a relationship between an attribute and an entity is generated. Subsequent access are compared to the graph to determine if the subsequent access corresponds to a new relationship. The subsequent access is allowed if the subsequent access does not correspond to a new relationship. The subsequent access further analyzed if the subsequent access corresponds to a new, unexpected relationship.

18 Claims, 4 Drawing Sheets

(56) References Cited

U.S. PATENT DOCUMENTS

| | | | |
|---|---|---|---|
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,952,779 B1 * | 10/2005 | Cohen | G06F 21/577 726/22 |
| 7,013,395 B1 * | 3/2006 | Swiler | H04L 63/1433 713/151 |
| 7,289,976 B2 | 10/2007 | Kihneman et al. | |
| 7,340,411 B2 | 3/2008 | Cook | |
| 7,530,105 B2 * | 5/2009 | Gilbert | G06F 21/55 709/222 |
| 7,620,655 B2 | 11/2009 | Larsson et al. | |
| 7,748,040 B2 * | 6/2010 | Adelstein | H04L 63/1491 726/25 |
| 7,958,560 B1 * | 6/2011 | Guruswamy | G06F 21/566 709/224 |
| 8,056,115 B2 * | 11/2011 | Treinen | H04L 63/1416 709/206 |
| 8,065,257 B2 * | 11/2011 | Kuecuekyan | G06N 99/005 706/45 |
| 8,099,760 B2 * | 1/2012 | Cohen | H04L 63/1433 726/2 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0177744 A1 | 7/2009 | Marlow et al. | |

\* cited by examiner

TECHNIQUES AND ARCHITECTURES FOR CROSS-ORGANIZATION THREAT DETECTION

TECHNICAL FIELD

Embodiments relate to electronic data security. More particularly, embodiments relate to techniques for monitoring accesses to electronic data/resources to identify patterns that indicate an attack.

BACKGROUND

Data/resource security is a wide-ranging problem for nearly all users of electronic devices. Many strategies have been developed for detection of attacks. However, these strategies are generally reactive in that detection and/or correction only occurs after attacks have occurred. Thus, using traditional techniques, data/resources are exposed to novel attack vectors.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
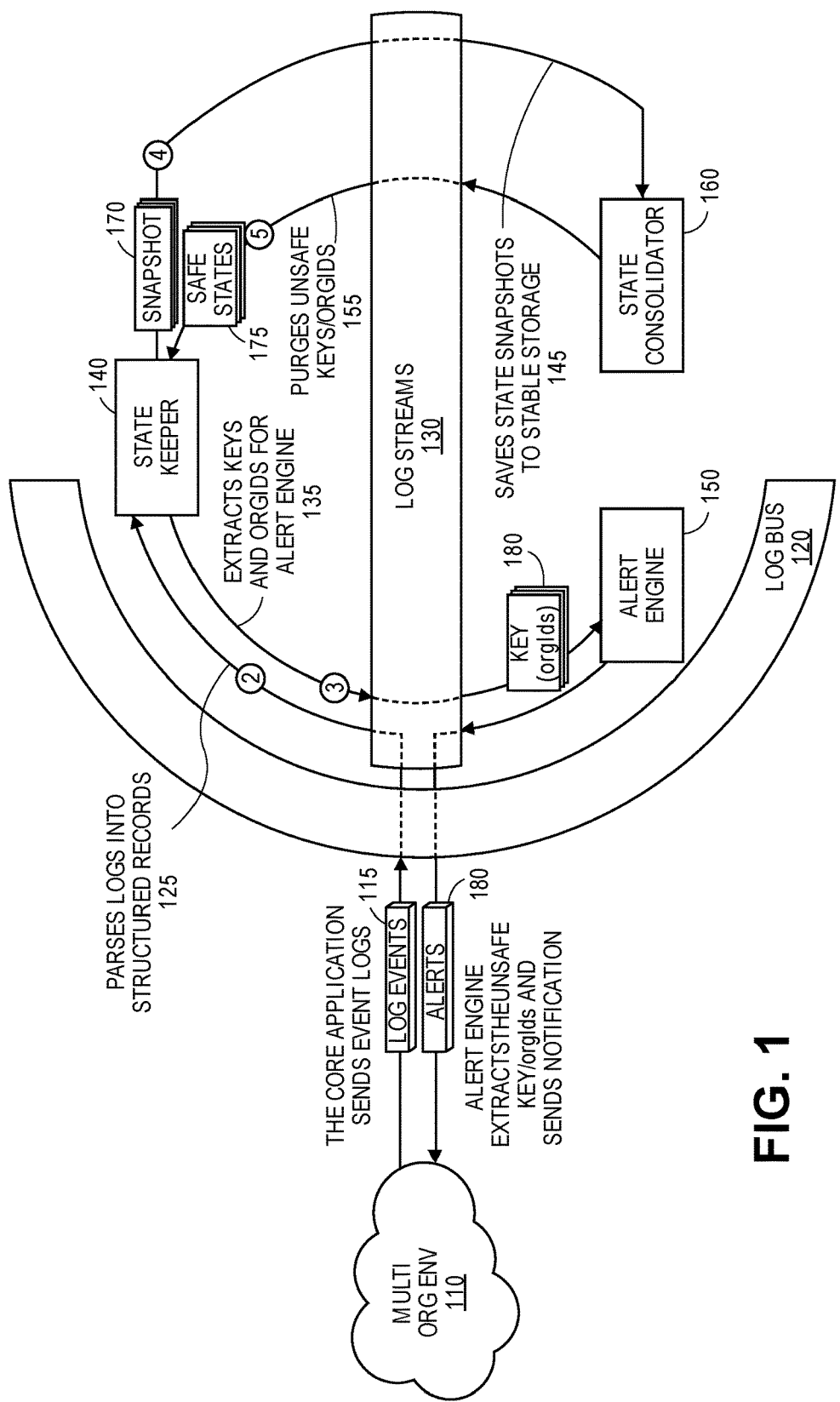
FIG. 1 is a high-level diagram of one embodiment of an environment in which cross-organization threat detection may be utilized.

In the following description, numerous specific details are set forth. However, embodiments of the invention may be practiced without these specific details. In other instances, well-known structures and techniques have not been shown in detail in order not to obscure the understanding of this description.

Throughout the following description the phrases "cross-organization" and "cross-org" are used to refer to accesses/activities that occur similarly (or identically) across multiple (possibly unrelated) organizations within an multi-organizational environment, but not necessarily across (or between) organizations at the same time or one organization threatening/accessing another. That is, the cross-org threats identified using the techniques described herein occur when the same type of attack appears multiple times involving different organizations within the multi-organizational environment. Thus, the attack strategies are applied across organizations within the multi-organizational environment.

Described herein are architectures and techniques that can function to detect malicious cross-organization activities in a multi-organization (multi-tenant, multi-group, multi-customer, multi-team) environment. For example, if some entity accesses multiple organizations in the multi-organization environment, for example, to exfiltrate data, this activity should be identified and stopped. In one embodiment, an access is considered suspicious if the following criteria are met: 1) an access associated with the attribute in question is seen among multiple unrelated organizations; 2) the number of organizations involved in the cross-org access exceeds the pre-defined threshold; 3) these organizations do not resolve the same identity.

Other sets of criteria can be used in addition to, or in place of, the example criteria listed above. For example, an access can be considered suspicious if the following criteria are met: 1) an access associated with the attribute in question is seen among multiple unrelated organizations; 2) the number of organizations involved in the cross-org access exceeds the pre-defined threshold; 3) the accesses to the multiple unrelated organizations happen within a pre-defined period of time. Theses examples include three criteria each, but any number of criteria can be supported.

As described in greater detail below, models can be developed/applied/triggered to monitor relationships within the environment. For example, a relationship between IP addresses and organization IDs (e.g., which organization IDs a particular IP address is connected to) can be monitored. As another example, the relationship between browser fingerprints and account IDs can be monitored. In the description that follows, IP addresses and fingerprints are generally referred to as "Attributes" and organization IDs and account IDs are referred to as "Entities." Different and/or additional attributes and entities can also be supported and/or monitored. In one embodiment, a fingerprint is device specific information that can fully identify an individual user or device when browser cookies are disabled.

The various architectures described herein provide a graph-centric mechanism using one or more models that share a single graph database. In one embodiment, each model does not keep its graph in its memory space, but queries the graph database for relevant information. In these embodiments, using a database reduces the collective memory footprint and allows for correlation of entities to improve accuracy. Use of the graph database can further reduce code complexity and/or simplify sharing of models and other related information.

As described in greater detail below, the mechanisms described herein provide an identity resolution functionality that allows correlation between attributes and entities to infer whether different entities resolve the same identity. For example, the same customer (company, group) can own multiple organizations within the multi-organizational (multi-org) environment. In this situation a single attribute accessing these organizations is not suspicious, but a single attribute accessing unrelated organizations would be considered suspicious. In one embodiment, identity resolution can determine whether multiple entities are historically linked by some attributes (e.g., integration partners), thus new activities linking them would be less suspicious. These and other features can reduce the number of false positives experienced.

In one embodiment, the mechanisms described herein can be implemented using a cluster computing framework (e.g., Apache Spark, Open Cluster Framework, GeoSpark), a non-relational, distributed database (e.g., Apache HBase, Google BigTable, DynamoDB), and database engine (Apache Phoenix). In one embodiment, the cluster computing framework can function to provide a real-time (or near real-time) platform for processing (e.g., data retrieval, edge/vertex updates, detection) as well as graphing functionality.

In one embodiment, the database provides low-latency, scalable storage for vertex (e.g., attributes, entities) tables, edge (e.g., connections between attributes and entities) tables, and/or external intelligence tables. In one embodiment, the database can be co-located with the cluster computing framework to reduce network traffic. In one embodiment, the database engine provides the ability to interact with the database using Structured Query Language (SQL) syntax. Other database syntaxes can be supported as well. Using the example specific implementation described above, a Phoenix-Spark plugin can be used to support retrieval of entire graphs as a DataFrame, which can be converted to a GraphFrame for identity resolution. Various other embodiments are described in greater detail below.

FIG. 1 is a high-level diagram of one embodiment of an environment in which cross-organization threat detection may be utilized. In various embodiments, the mechanisms described herein can operate within (or interact with) an on-demand services environment, which can include, for example, at least a multitenant database environment. Embodiments of on-demand services environments are described in greater detail below.

Multi-organizational environment 110 represents any environment in which multiple organizations share one or more resources while having data security so that data belonging to one organization can be secure and not accessible by users from other organizations. Multi-organizational environment 110 can be, for example, a cloud computing environment provided by Salesforce.com.

In one embodiment, one or more components of multi-organizational environment 110 can send event logs 115 log streams 130. In one embodiment, log streams 130 provides a mechanism to store and maintain event log information. In one embodiment, the event logs are stored chronologically as a stream. In other embodiments, other strategies can be utilized. Log bus 120 can be utilized to communicate log information between components.

In one embodiment, state keeper 140 can parse log information from log streams 130 into structured records 125. In one embodiment, state keeper 140 can extract (135) keys, organization IDs (and/or other information) 135 for alert engine 150. In one embodiment, state keeper 140 also generates state snapshots (170) to be stored in a stable storage (e.g., memory, database) 145. In one embodiment, the state snapshot is provided to state consolidator 160.

In one embodiment, in order to determine "normal" or safe behaviors, the mechanisms described herein can operate to collect data that corresponds to acceptable (or safe) behavior for a period of time and accumulate stateful information. In one embodiment, once the mechanism has gathered enough data to be able to model "normal" behaviors, the training/configuration phase can be terminated.

In one embodiment, state consolidator 160 purges unsafe keys/organization IDs 155. Safe IDs (175) are provided back to state keeper 140. The safe ID information can be used for subsequent cross-org threat analysis. In one embodiment, alert engine 150 operates to extract unsafe key(s) and/or org IDs (180) to be sent (135) to alert engine 150. Alert engine 150 functions to send alerts based on analysis of key(s), org IDs, and/or other information. Various techniques for threat analysis are described in greater detail below. Alerts can include, for example, email notifications to authorized users and/or system administrators, pop-up type alerts, text messages, and/or security operations including, for example, access restrictions.

Figure 2:
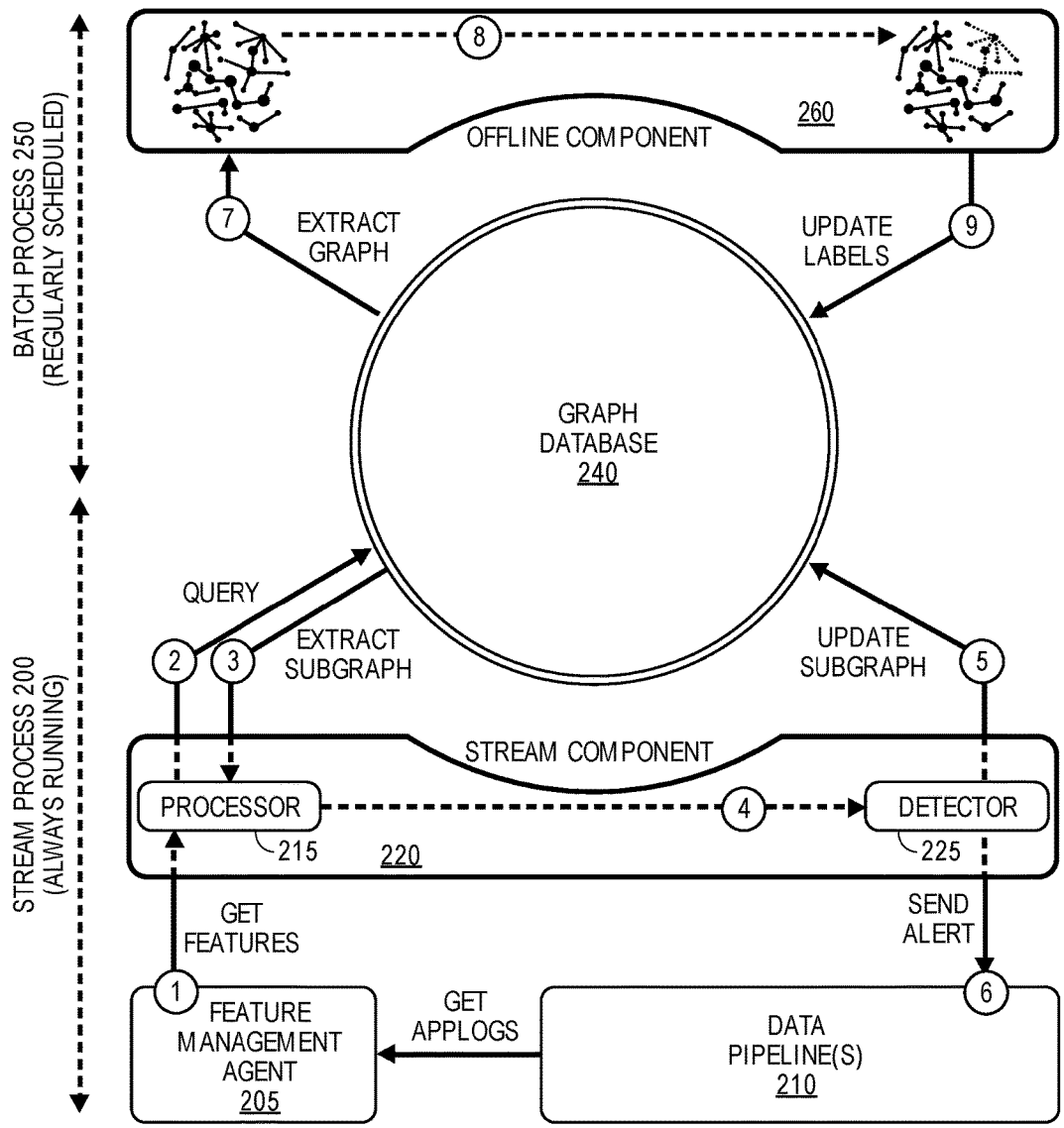
FIG. 2 is a conceptual diagram of one embodiment of a cross-organization threat detection mechanism.

FIG. 2 is a conceptual diagram of one embodiment of a cross-organization threat detection mechanism. The mechanism illustrated in FIG. 2 includes three layers: a graph-like database, processing, and communication. The graph-like database functions to store the graphs. The processing layer handles detection, graph updates and identity resolutions. The communication layer reads log files and communicates with one or more core applications (e.g., within multi-org environment 110 of FIG. 1).

The example mechanism of FIG. 2 includes stream processing portion 200 and batch processing portion 250. In the example described, stream processing portion 200 runs in real time (or near real time) to perform detection of cross-org malicious activities using graph database 240. In one embodiment, batch processing portion 250 runs regularly in batch mode to perform identity resolution functions.

In one embodiment, data pipeline(s) 210 maintain and/or communicate log files corresponding to one or more applications running within organization space of various organizations within a multi-org environment. In one embodiment, data pipeline(s) 210 can be provided utilizing, for example, Apache Kafaka™, which can be used for building real-time data pipelines and streaming apps by managing streams of data like a messaging system. Other implementations can also be supported.

In one embodiment, data pipeline(s) 210 provide one or more application logs (applogs) to feature management agent 205. Feature management agent 205 analyzes the applogs to extract features, which represent combinations of entities and attributes from the applogs.

In one embodiment, analytics platform 220 includes processor 215 and detector 225. In one embodiment, analytics platform 220 provides a fast (real-time or near real-time) scheduling capability platform to provide streaming analytics. Analytics platform 220 can be provided by, for example, Apache Spark Streaming or similar platform. In one embodiment, analytics platform 220 ingests data in mini batches and performs Resilient Distributed Dataset (RDD) transformations on the data.

In one embodiment, every applog line represents a relationship (or edge) between an attribute and an entity. Feature management agent 205 draws unstructured applogs from data pipeline(s) 210 to extract relevant attribute-entity edges. In one embodiment, when malicious cross-org activities are detected, alerts are sent from detector 225 to data pipeline(s) 210, to be delivered to the intended targets.

In one embodiment, processor 215 operates to query graph database 240 to extract one or more subgraphs corresponding to the features processor 215 has received from feature management agent 205. In one embodiment, processor 215 uses every attribute-entity edge to query graph database 240 for a subgraph centered on the given attributes. The edge represents new activity from the attribute. The subgraph represents what is known about previous interactions between the attribute and other entities. In one embodiment the edge in question and the returned subgraph are evaluated together to determine whether the new activity is suspicious.

In one embodiment, if the current access matches an existing edge in the subgraph, that access is considered known (or expected or safe). If the current access does not match an existing edge in the subgraph, that access is considered a new relationship (i.e., a new edge). The new relationship may be safe (e.g., within the expected ranges of attributes and/or entities). The new relationship may be unsafe (or unexpected, or unknown, or unreliable) and further analysis and/or action (e.g., blocking the access) can be performed.

In one embodiment, processor 215 provides the analysis to detector 225 and detector 225 makes the determination as to whether the new activity is suspicious. If the new activity is suspicious, detector 225 sends alert information to data pipeline(s) 210. Detector 225 also functions to update the relevant subgraph in graph database 240.

In one embodiment, identity resolver 260 operates in a batch (or offline) manner to perform identity resolution functions. In one embodiment, identity resolver 260 is implemented as a cluster computing framework, for example, utilizing Apache Spark (or similar technology). In one embodiment, identity resolver 260 extracts a full bipartite graph from graph database 240. In an alternate embodiment, identity resolver 260 can extract a partial graph.

Identity resolver 260 analyzes the extracted graph to provide identity resolution functionality utilizing, for example, graph tools like GraphX and/or GraphFrame. Identity resolver 260 updates the labels of one or more entities in database 240. In one embodiment, identity resolution is performed as a batch function periodically, for example, every two days, every five days, etc.

In some embodiments, information from outside the applogs can be utilized to provide/support identity resolution. For example, additional information can be utilized for Internet Protocol (IP) addresses (e.g., WHOIS, geo or autonomous system related information). As another example, metadata and/or derived information from the multi-org platform can be utilized for identity resolution.

This external information can be, for example, metadata about attributes and/or entities. Thus, the relationships can be described as a vertex-metadata bipartite graph. In one embodiment, the table representing the graph can have the following schema:
  Vertex
  Vertex Type (Attribute/Entity)
  Metadata
  Metadata Type (IP Address, ASN, etc.)
This allows metadata to be added to database 240 independently (i.e., without having to modify existing edges in the attribute-entity graph).

Database 240 stores graph information to be utilized for cross-org threat analysis as described herein. In one embodiment, the attribute-entity graph is stored in the form of two tables in the database. In one embodiment, the number of models deployed does not change the number of tables used. That is all edges and vertices for any number of models can be stored in two tables.

Figure 3:
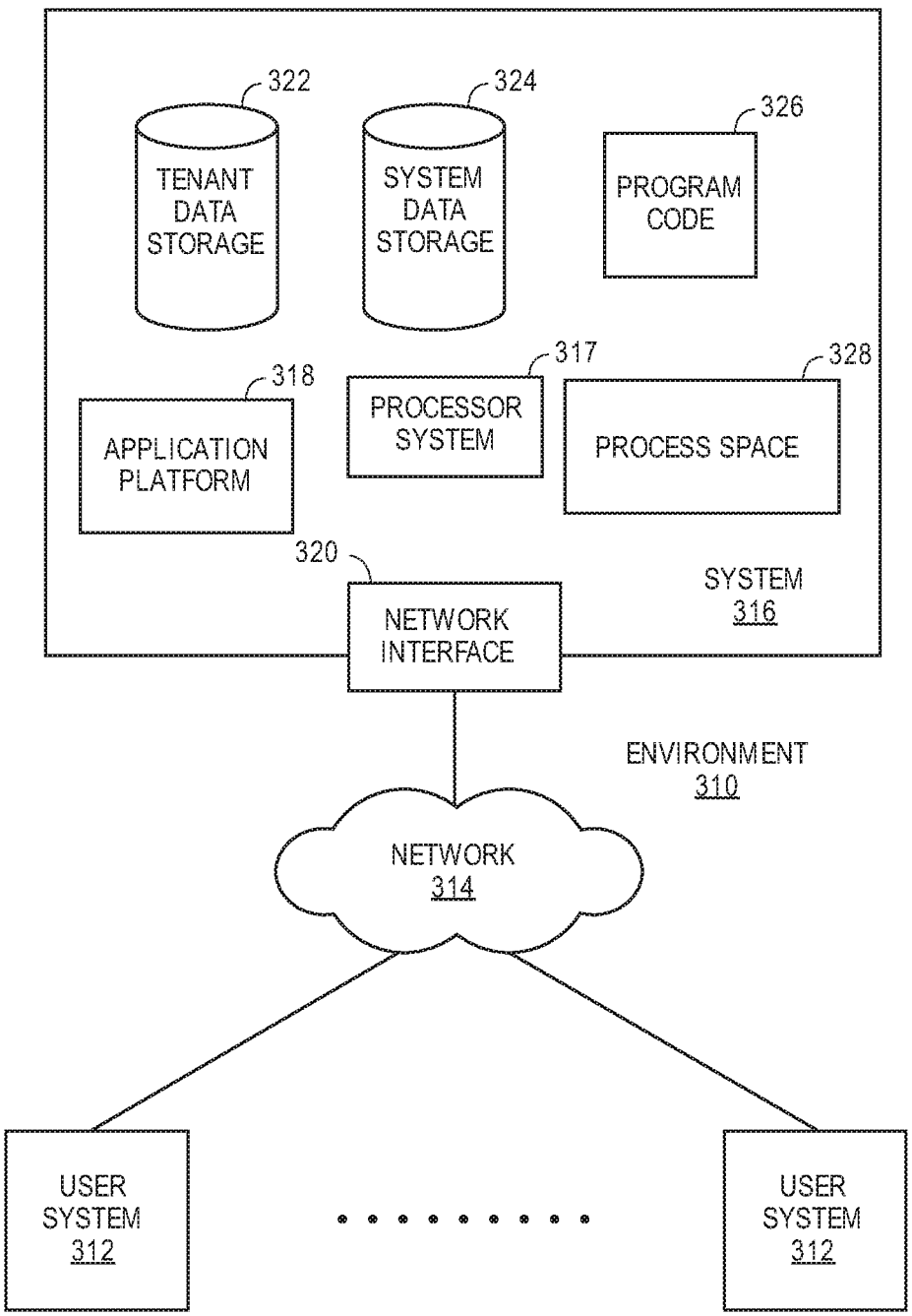
FIG. 3 illustrates a block diagram of an environment wherein an on-demand database service might be used.

In one embodiment, the edge and vertex tables have the following schema:
  Edge Schema
  Attribute ID
  Entity ID
  Created Timestamp
  Last Seen Timestamp
  Access Count (how many times has this edge been seen?)
  Edge Metadata
  Vertex Schema
  ID
  Vertex Type (Entity/Attribute)
  Created Timestamp
  Last Seen Timestamp
  Updated Timestamp
  Identity
  Vertex Metadata FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Core series processor or the like. Similarly, system 316 (and additional instances of an MTS, where more than one is present) and all of their components might be operator configurable using application(s) including computer code to run using a central processing unit such as processor system 317, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
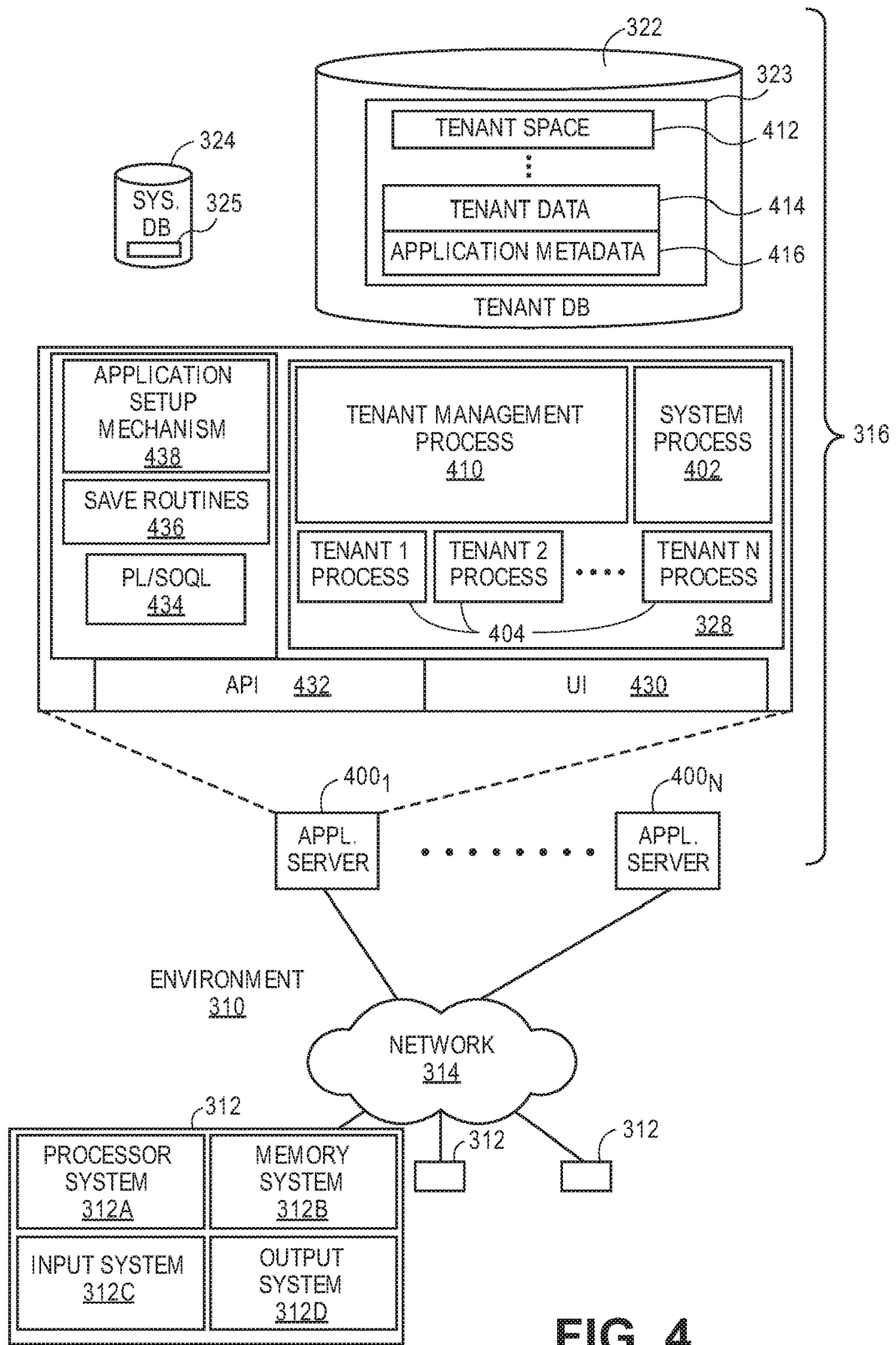
FIG. 4 illustrates a block diagram of an environment wherein an on-demand database service might be used.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 BIG-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:
1. A method comprising:
maintaining, within a database, attribute data corresponding to accesses to a multi-organizational environment and entity data corresponding to accesses to the multi-organizational environment, wherein maintaining attribute data and entity data comprises at least maintaining a first database table with the attribute data corresponding to the accesses to the multi-organizational environment and maintaining a second database table with the entity data corresponding to the accesses to the multi-organizational environment;
generating a graph based on the attribute data and the entity data where graph edges represent a relationship between an attribute and an entity;
comparing a subsequent access to the multi-organizational environment to the graph to determine if the subsequent access corresponds to a new relationship;
allowing the subsequent access if the subsequent access does not correspond to a new relationship;
analyzing the subsequent access further if the subsequent access corresponds to a new, unexpected relationship.
2. The method of claim 1 wherein the attribute data comprises at least Internet Protocol (IP) addresses and digital fingerprint information.
3. The method of claim 2 wherein the digital fingerprint information comprises device specific information that can fully identify an individual user or device when browser cookies are disabled.
4. The method of claim 1 wherein the entity data comprises organization identifiers, account identifiers and user identifiers.
5. The method of claim 1 wherein the attribute data comprises at least device specific information that can identify an individual user or device when browser cookies are disabled.

6. The method of claim 1 wherein each model does not keep its graph in its memory space, but queries the graph database for relevant information.

7. A non-transitory computer-readable medium having stored thereon instructions that, when executed by one or more processors, are configurable to cause the one or more processors to:
- maintain, within a database, attribute data corresponding to accesses to a multi-organizational environment and entity data corresponding to accesses to the multi-organizational environment, wherein maintaining attribute data and entity data comprises at least maintaining a first database table with the attribute data corresponding to the accesses to the multi-organizational environment and maintaining a second database table with the entity data corresponding to the accesses to the multi-organizational environment;
- generate a graph based on the attribute data and the entity data where graph edges represent a relationship between an attribute and an entity;
- compare a subsequent access to the multi-organizational environment to the graph to determine if the subsequent access corresponds to a new relationship;
- allow the subsequent access if the subsequent access does not correspond to a new relationship;
- analyze the subsequent access further if the subsequent access corresponds to a new, unexpected relationship.

8. The non-transitory computer-readable medium of claim 7 wherein the attribute data comprises at least Internet Protocol (IP) addresses and digital fingerprint information.

9. The non-transitory computer-readable medium of claim 8 wherein the digital fingerprint information comprises device specific information that can fully identify an individual user or device when browser cookies are disabled.

10. The non-transitory computer-readable medium of claim 7 wherein the entity data comprises organization identifiers, account identifiers and user identifiers.

11. The non-transitory computer-readable medium of claim 7 wherein the attribute data comprises at least device specific information that can identify an individual user or device when browser cookies are disabled.

12. The non-transitory computer-readable medium of claim 7 wherein each model does not keep its graph in its memory space, but queries the graph database for relevant information.

13. A system comprising:
- a physical memory device;
- one or more hardware processors coupled with the physical memory device, the one or more processors configurable to maintain, within a database, attribute data corresponding to accesses to a multi-organizational environment and entity data corresponding to accesses to the multi-organizational environment, wherein maintaining attribute data and entity data comprises at least maintaining a first database table with the attribute data corresponding to the accesses to the multi-organizational environment and maintaining a second database table with the entity data corresponding to the accesses to the multi-organizational environment, to generate a graph based on the attribute data and the entity data where graph edges represent a relationship between an attribute and an entity, to compare a subsequent access to the multi-organizational environment to the graph to determine if the subsequent access corresponds to a new relationship, to allow the subsequent access if the subsequent access does not correspond to a new relationship, to analyze the subsequent access further if the subsequent access corresponds to a new, unexpected relationship.

14. The system of claim 13 wherein the attribute data comprises at least Internet Protocol (IP) addresses and digital fingerprint information.

15. The system of claim 14 wherein the digital fingerprint information comprises device specific information that can fully identify an individual user or device when browser cookies are disabled.

16. The system of claim 13 wherein the entity data comprises organization identifiers, account identifiers and user identifiers.

17. The system of claim 13 wherein the attribute data comprises at least device specific information that can identify an individual user or device when browser cookies are disabled.

18. The system of claim 13 wherein each model does not keep its graph in its memory space, but queries the graph database for relevant information.

* * * * *